(12) United States Patent
Passmann

(10) Patent No.: US 11,590,946 B2
(45) Date of Patent: Feb. 28, 2023

(54) DEVICE AND METHOD FOR CALCULATING BRAKE PRESSURE, VEHICLE, COMPUTER PROGRAMME AND CONTROL UNIT

(71) Applicant: ZF Active Safety GmbH, Koblenz (DE)

(72) Inventor: Andreas Passmann, Hilgert (DE)

(73) Assignee: ZF Active Safety GmbH, Koblenz (DE)

( * ) Notice: Subject to any disclaimer, the term of this patent is extended or adjusted under 35 U.S.C. 154(b) by 324 days.

(21) Appl. No.: 16/958,818

(22) PCT Filed: Dec. 18, 2018

(86) PCT No.: PCT/EP2018/085381
§ 371 (c)(1),
(2) Date: Jun. 29, 2020

(87) PCT Pub. No.: WO2019/129533
PCT Pub. Date: Jul. 4, 2019

(65) Prior Publication Data
US 2021/0070268 A1 Mar. 11, 2021

(30) Foreign Application Priority Data
Dec. 28, 2017 (DE) .......................... 102017012110.9

(51) Int. Cl.
*B60T 8/94* (2006.01)
*B60T 8/88* (2006.01)
(Continued)

(52) U.S. Cl.
CPC .............. *B60T 8/885* (2013.01); *B60T 8/172* (2013.01); *B60T 8/1761* (2013.01); *B60T 2270/10* (2013.01); *B60T 2270/416* (2013.01)

(58) Field of Classification Search
CPC ... B60T 8/92; B60T 8/94; B60T 17/22; B60T 13/662; B60T 13/66; B60T 2270/416;
(Continued)

(56) References Cited

U.S. PATENT DOCUMENTS 4,648,662 A * 3/1987 Fennel .................... B60T 8/885
303/122.04
5,493,495 A * 2/1996 Naito ...................... B60T 8/885
701/76
(Continued)

FOREIGN PATENT DOCUMENTS

DE 3417019 A1 11/1985
DE 19511161 A1 10/1996
(Continued)

*Primary Examiner* — Tan Q Nguyen
(74) *Attorney, Agent, or Firm* — Robert James Harwood

(57) ABSTRACT

A method and device for a vehicle having wheels which are each assigned a sensor for generating wheel signals. The unit determines whether a wheel is affected by a failure of the corresponding wheel signal. The unit acquires wheel signals which are assigned to the wheels, and for a wheel affected by a wheel signal failure, the corresponding wheel signal is acquired in the form of a substitute signal. The unit calculates a target brake pressure for a wheel at which an increase in brake pressure is necessary. The increase in brake pressure takes place in accordance with the wheel signal which is obtained for the wheel and in accordance with the determination as to whether the wheel is affected by a wheel signal failure. The unit further determines a slip threshold for an anti-lock brake control operation applied to the wheel affected by the wheel signal failure.

15 Claims, 10 Drawing Sheets

(51) Int. Cl.
*B60T 8/172* (2006.01)
*B60T 8/1761* (2006.01)
*B60T 13/66* (2006.01)

(58) Field of Classification Search
CPC ............. B60T 2270/82; B60T 2270/10; B60T 2270/20; B60T 2270/30
See application file for complete search history.

(56) References Cited

U.S. PATENT DOCUMENTS

| | | | | |
|---|---|---|---|---|
| 5,615,934 | A * | 4/1997 | Abuelsamid | ............ B60T 8/172 |
| | | | | 303/167 |
| 5,752,751 | A * | 5/1998 | Nakaura | ................. B60T 8/885 |
| | | | | 303/170 |
| 5,832,402 | A * | 11/1998 | Brachert | ............... B60T 8/1764 |
| | | | | 701/72 |
| 2010/0117447 | A1* | 5/2010 | Cahill | ..................... B60T 8/885 |
| | | | | 303/126 |
| 2019/0337503 | A1* | 11/2019 | Otremba | ............... B60T 13/662 |
| 2021/0323515 | A1* | 10/2021 | Scheuerell | ........... B60K 17/348 |

FOREIGN PATENT DOCUMENTS

| | | |
|---|---|---|
| DE | 19511162 A1 | 10/1996 |
| DE | 19705619 A1 | 8/1998 |
| WO | 2008147579 A1 | 12/2008 |

* cited by examiner

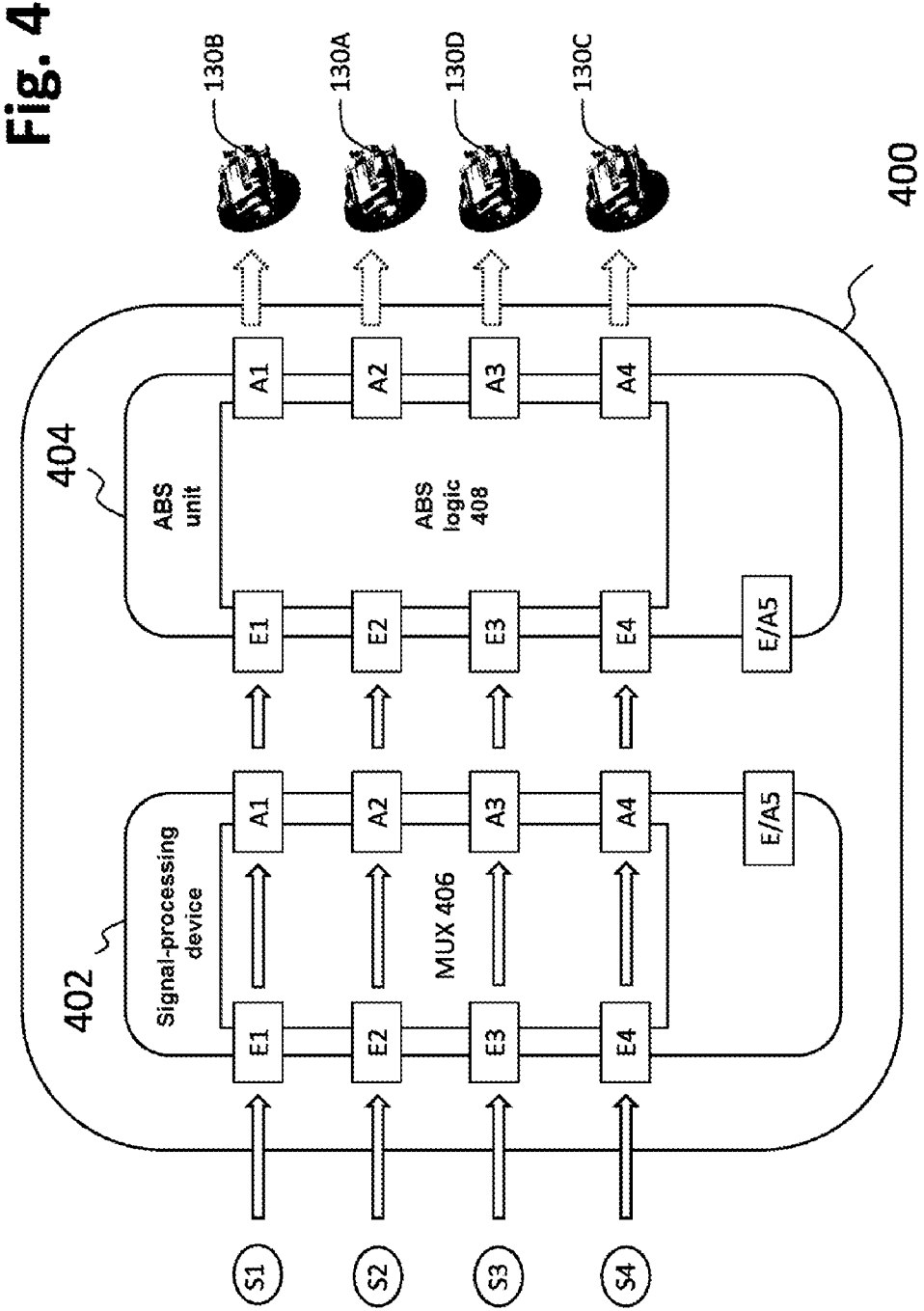

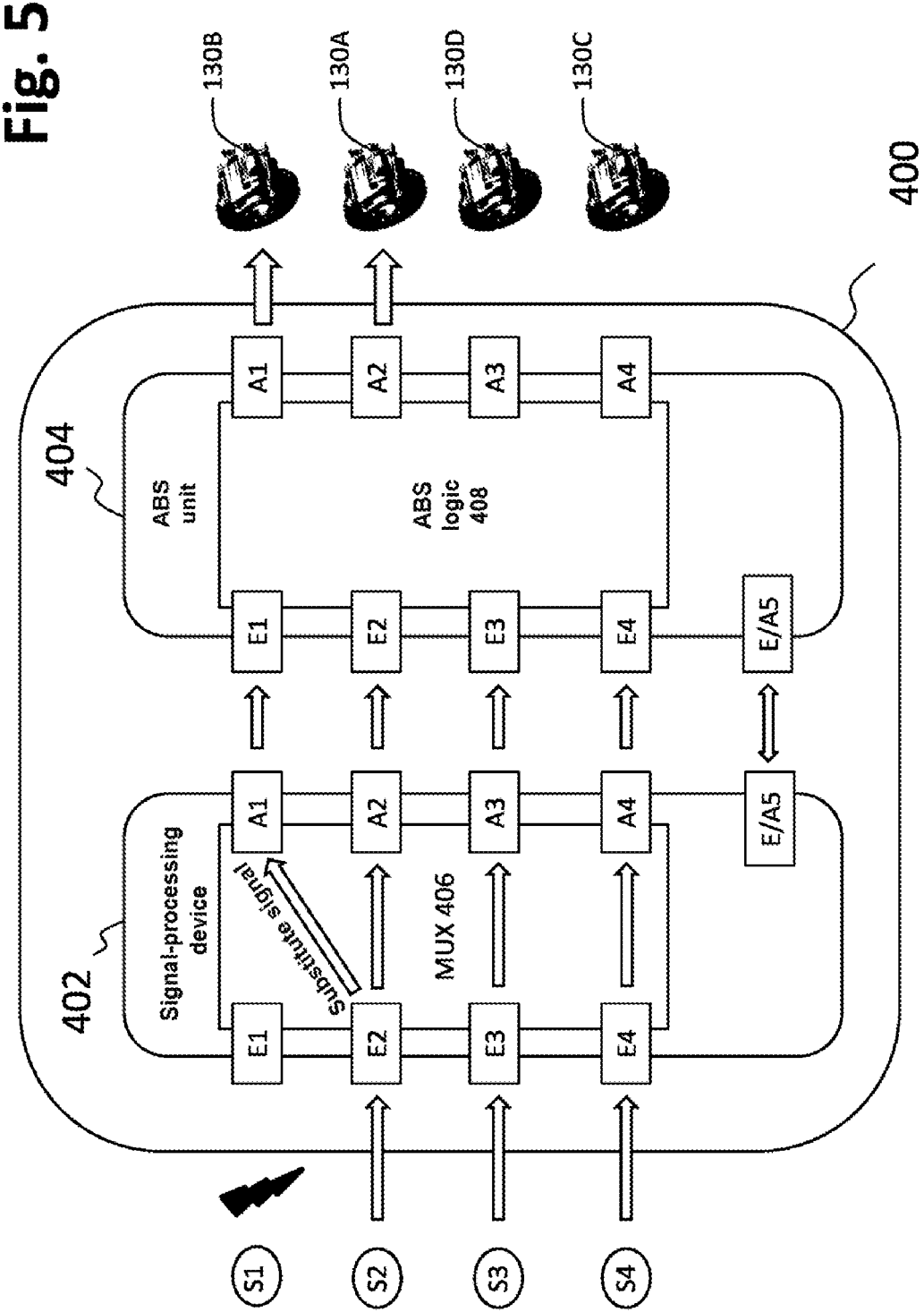

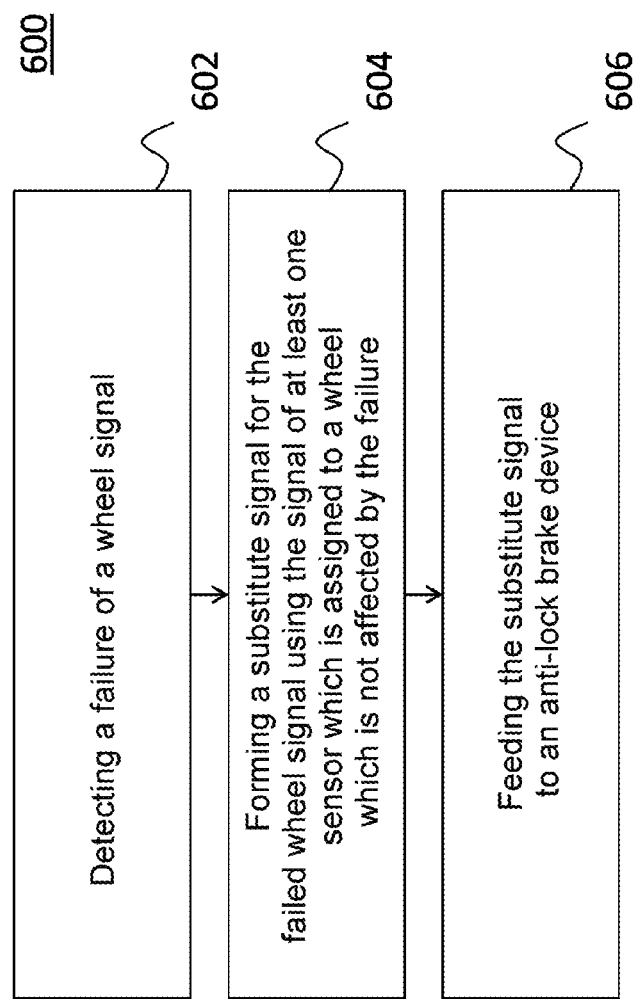

DEVICE AND METHOD FOR CALCULATING BRAKE PRESSURE, VEHICLE, COMPUTER PROGRAMME AND CONTROL UNIT

CROSS-REFERENCE TO RELATED APPLICATION

This application is a national stage of International Application No. PCT/EP2018/085381, filed Dec. 18, 2018, the disclosure of which is incorporated herein by reference in its entirety, and which claimed priority to German Patent Application No. 102017012110.9, filed Dec. 28, 2017, the disclosure of which is incorporated herein by reference in its entirety.

TECHNICAL FIELD

The present disclosure relates generally to the field of vehicle brake systems. Specifically, aspects relating to the operation of such a brake system in the case of a failure of a wheel signal are described.

BACKGROUND

Known hydraulic vehicle brake systems, which are embodied as a brake-by-wire (BBW) system or are equipped with an electric brake boost (EBB) system comprise an actuator which can be actuated electrically and in the service brake mode generates a hydraulic pressure at the wheel brakes of the motor vehicle or boosts a hydraulic pressure generated by the driver. For this purpose, a deceleration of the vehicle which is requested by the driver at a brake pedal is sensed by a sensor and converted into an actuation signal for the actuator.

Such brake systems generally also comprise a master cylinder which can be activated mechanically by means of the brake pedal and via which hydraulic fluid can also be delivered to the wheel brakes. The master cylinder which can be activated by means of the brake pedal provides redundancy, indispensable for reasons of operational safety, with respect to the BBW or EBB system which can be actuated electrically.

Modern brake systems also comprise a vehicle movement dynamics control system (also referred to as electronic stability control, ESC) which comprises, for example, one or more functions such as a traction control system (TSC), an anti-lock brake system (ABS) or an electronic stability program (ESP). There are requirements also to configure the vehicle movement dynamics control system in a redundant fashion. In other words, in the event of a loss of functioning of the vehicle movement dynamics control system at least rudimentary vehicle movement dynamics control is still to be possible in order to be able to maintain the stability of the vehicle or the deceleration capability at least partially.

Brake systems for autonomous or partially autonomous vehicles also have to be configured in a redundant fashion, especially since the driver is not necessarily located in the vehicle (e.g. in a remote controlled parking (RCP) operation) or cannot intervene directly in the operation of the vehicle. The vehicle movement dynamics control system and, here in particular the ABS, becomes highly significant in this context. For example, stringent requirements are made of the ABS with respect to its availability. In a conventional vehicle, the ABS can in fact be easily deactivated in the event of a fault and the driver can be alerted to this deactivation, in order to encourage him to maintain a safer driving style. In contrast, during autonomous or partially autonomous driving the vehicle system remains fully responsible over a long time period or even permanently.

A frequent fault situation which brings about deactivation of the ABS in a conventional vehicle is the failure of a wheel signal which is used by the ABS for slip detection and slip control on the corresponding vehicle wheel. In order to prevent this fault situation, the corresponding wheel sensor system (if appropriate including the feed lines) can be configured in a redundant fashion. However, such redundancy entails high costs. As an alternative to this, in the case of a wheel signal failure, for example for a front wheel, a closed-loop control operation at the wheels of the front axle can be deactivated, and the wheels of the rear axle could be concentrated on in order to prevent at least oversteering. However, the stability limitations which result from this approach are not acceptable in many cases, for example during autonomous or partially autonomous driving.

SUMMARY

The present disclosure is based on the object of specifying technical solutions which are less susceptible to the failure of a wheel signal.

According to a first aspect, a signal-processing device is specified for a vehicle having an ABS unit and a plurality of wheels which are each assigned a sensor for generating wheel signals. The device is designed to detect a failure of a wheel signal, to form a substitute signal for the failed wheel signal using the wheel signal of at least one sensor which is assigned to a wheel which is not affected by the failure, and to feed the substitute signal to the ABS unit.

The device can be part of an ABS. For example, the device can be installed in an ABS control unit or be implemented in some other way (e.g. using a processor unit and software).

According to one variant, the device is also designed to make a selection from wheel signals of those sensors which are assigned to wheels which are not affected by the failure. In this case, the substitute signal can correspond to the selected wheel signal or be at least decisively based thereon. Accordingly it is possible to form the substitute signal decisively on the basis of the selected wheel signal, but additionally one or more further wheel signals which are present and/or other types of sensor signals can be taken into account in the formation of the substitute signal. The substitute signal is then based, for example, decisively on the selected wheel signal if a deviation between the substitute signal and the selected wheel signal is less than 20%, in particular less than 10% or less than 5%.

The selection from the wheel signals can be made in accordance with a detected split p situation. In a split p situation, different coefficients of friction of the underlying surface are present for a first wheel on a first side of the vehicle and a second vehicle wheel on a second opposite side of the vehicle. The two vehicle wheels which lie opposite one another and which have different coefficients of friction of the underlying surface can be assigned, in particular, to the same vehicle axle.

In one variant, the failed wheel signal is assigned to a rear wheel. According to this variant, the device is also designed to carry out split μ detection or split μ plausibility checking on the basis of wheel signals of sensors which are assigned to front wheels. According to another variant, the failed wheel is assigned to a first front wheel. According to this variant, the device is also designed to carry out split μ detection or split μ plausibility checking on the basis of wheel signals of sensors which are assigned to a second front wheel which is not affected by the failure and to a rear wheel which is diagonally opposite the second front wheel. The plausibility checking of a split µ situation by the device can be used for verifying whether the previously detected split µ situation is still present.

The abovementioned selection from wheel signals of sensors which are assigned to wheels which are not affected by the failure can comprise selecting the wheel signal from that wheel which lies opposite the wheel vehicle side which is affected by the failure. Such a selection strategy can be implemented, in particular, when a split µ situation is not present or is not detected.

Furthermore, when a split µ situation is detected, the selection can be made in accordance with whether the wheel signal has failed for a wheel of a side with a high coefficient of friction or a side with a low coefficient of friction. In the case of a failure of a wheel signal for a first rear wheel on a side with a high coefficient of friction, the wheel signal can be selected for a second rear wheel on a side with a low coefficient of friction. In the case of a failure of a wheel signal for a rear wheel on a side with a low coefficient of friction, the wheel signal for a front wheel on the side with the low coefficient of friction can be selected. In the case of a failure of a wheel signal for a front wheel on a side with a high coefficient of friction, the wheel signal for a rear wheel on the side with the high coefficient of friction can be selected. In the case of a wheel signal for a first front wheel on a side with a low coefficient of friction, the wheel signal for a second front wheel on the side with a low coefficient of friction can be selected.

An anti-lock brake system which comprises the signal-processing device presented above and an ABS unit is also specified. The signal-processing device and the ABS unit can be accommodated together in an ABS control unit.

According to one variant, the ABS unit comprises an assigned wheel signal input for each sensor (and therefore for each wheel). In this case, the signal-processing device can be designed to feed the substitute signal to that wheel signal input which is assigned to the failed wheel signal. The wheel signal inputs can be implemented physically in the form of hardware and/or logically in the form of software.

The signal-processing device can also be designed to generate a failure signal which indicates the wheel affected by the failure. The failure signal can indicate, for example, that the failure relates to a right-hand rear wheel, to a left-hand rear wheel, to a right-hand front wheel or to a left-hand front wheel. The anti-lock brake device can have an output for the failure signal. The signal-processing device can feed the failure signal to the ABS unit via this output.

The ABS unit can be designed to detect, on the basis of the at least one substitute signal (and if appropriate one or more of the wheel signals which are still present), a need for an anti-lock brake control operation at the wheel which is affected by the failure and/or to carry out an anti-lock brake operation at the wheel which is affected by the failure.

When a split µ situation is present, the ABS unit can be designed to carry out a select low closed-loop control operation of the rear axle in the case of a failure of a wheel signal for a rear wheel. In addition or as an alternative, the ABS unit can be designed to activate an individual closed-loop control operation in order to bring about minimum deceleration at the rear axle in the case of failure of a wheel signal for a front wheel.

The failed wheel signal can be assigned to a rear wheel. In this case, the ABS system can be designed to carry out split µ detection or split µ plausibility checking on the basis of wheel signals of sensors which are assigned to front wheels. If the failed wheel signal is assigned to a first front wheel, the system can be designed to carry out split µ detection or split µ plausibility checking on the basis of wheel signals of sensors which are assigned to a second front wheel which is not affected by the failure or to a rear wheel which lies diagonally opposite the second front wheel.

In one variant, the ABS unit is designed to generate an indication signal which indicates a split µ situation. The indication signal can indicate, for example for a specific vehicle wheel or a specific side of the vehicle (on the left-hand side/on the right-hand side) a specific coefficient of friction of the underlying surface or generally an indication of a high coefficient of friction of the underlying surface or a low coefficient of friction of the underlying surface. In this case, the signal-processing device can have an input for the indication signal in order to be able to receive the indication signal from the ABS unit.

The system can also be designed to calculate a target brake pressure for a wheel at which an increase in brake pressure is necessary. The increase in brake pressure may be necessary in relation to a normal service braking operation or an ABS-assisted service braking operation or in relation to something else. The calculation of the target brake pressure can be carried out in accordance with the wheel signal which is obtained for this wheel and in accordance with a determination as to whether this wheel is affected by a wheel signal failure.

The ABS unit can be designed to calculate, for the wheel affected by the failure, a slip threshold for the use of an anti-lock brake control operation. The slip threshold can be defined, for example, as a maximum permitted difference between the vehicle speed and the wheel speed, estimated on the basis of the substitute signal, of the wheel which is affected by the failure. The slip threshold which is calculated for the wheel affected by the failure may be lower than if the wheel were not affected by the failure. In this way, the slip threshold can be reduced for a specific wheel if a wheel signal failure has been detected for this wheel and the slip control is based at least essentially on the substitute signal.

A vehicle which comprises the anti-lock brake control system described here is also specified. The vehicle can be designed for autonomous or partially autonomous driving.

A further aspect of the present disclosure relates to a signal-processing method for a vehicle having an ABS unit and a plurality of wheels which are each assigned a sensor for generating wheel signals. The method comprises detecting a failure of a wheel signal, forming a substitute signal for the failed wheel signal using the wheel signal of at least one sensor which is assigned to a wheel which is not affected by the failure, and feeding the substitute signal to the ABS unit.

Another aspect of the present disclosure relates to a device for a vehicle having a plurality of wheels which are each assigned a sensor for generating wheel signals. The unit is designed to determine whether one of the wheels is affected by a failure of the corresponding wheel signal, to acquire wheel signals which are assigned to the wheels, wherein for a wheel affected by a wheel signal failure the corresponding wheel signal is acquired in the form of a substitute signal, and to calculate a target brake pressure for a wheel at which an increase in brake pressure is necessary, in accordance with the wheel signal which is acquired for this wheel, and in accordance with the determination as to whether this wheel is affected by a wheel signal failure.

The unit may be part of an ABS. In addition or as an alternative, the unit can also be part of an EBB or BBW system. Therefore, the unit can be installed in an ABS control unit and/or in a control unit for an EBB or BBW system, or can be implemented in some other way (e.g. using a processor unit and software).

The substitute signal may have been generated in any desired way. For example, the substitute signal may occur by estimating on the basis of sensor signals which are available in some other way and which do not necessarily have to comprise wheel signals.

The increase in the brake pressure may be necessary in relation to a normal service braking operation, for example if the driver activates the brake pedal. The increase in brake pressure can also occur for an ABS-assisted braking operation or in some other way (e.g. in the case of an emergency braking operation).

The device can also be designed to reduce the target brake pressure in cases in which the wheel at which the increase in brake pressure is necessary is affected by the wheel signal failure. Specifically, the target brake pressure which is calculated on the basis of the wheel signal which is obtained for this wheel (that is to say the substitute signal) can be given a lower setting than if the wheel were not affected by a wheel signal failure. In this context, the target brake pressure can be applied starting from the point when the predefined minimum vehicle deceleration or a predefined minimum brake pressure is reached at the wheel affected by the failure.

The device can also be designed to form the substitute signal using the wheel signal of at least one sensor which is assigned to a wheel which is not affected by the failure. This substitute signal can correspond, in particular as stated above, to a wheel signal (or be based decisively thereon) which is assigned to a comparison wheel which is not affected by the failure. In this case, the target brake pressure at the wheel which is affected by the failure can be calculated in such a way that it is lower than a wheel brake pressure which is calculated for the comparison wheel.

In addition or as an alternative, a predefined pressure difference can be maintained between the wheel affected by the failure and the comparison wheel (in particular if they are assigned to the same vehicle axle). In this context, absolute value of the pressure difference can depend on whether a signal of at least one further sensor of a vehicle dynamics control system is available. This further sensor is different from the sensors for generating wheel signals and can be designed, for example, to sense a longitudinal acceleration, a transverse acceleration, a steering angle, a main cylinder pressure or a yaw rate.

The device can also be designed to compensate pulling of the vehicle to one side as a result of the pressure difference (in particular at wheels on the same axle). This can occur, in particular, as a result of the setting of a brake pressure difference on opposing wheels of a vehicle axle which is not affected by the wheel signal failure.

Furthermore, the device can be designed to determine a slip threshold starting from which an anti-lock brake control operation starts at a wheel. The determination of the slip threshold can occur in accordance with the determination as to whether this wheel is affected by the wheel signal failure. In this context, the slip threshold for a wheel which is affected by the wheel signal failure can be set lower than the slip threshold which is for a wheel on the same axle and is not affected by the wheel signal failure.

Likewise, a vehicle is specified which comprises the unit presented here. The vehicle can be designed, in particular, for autonomous or partially autonomous driving.

A further aspect relates to a method for a vehicle having a plurality of wheels which are each assigned a sensor for generating wheel signals. The method comprises determining whether one of the wheels is affected by a failure of the corresponding wheel signal, acquiring wheel signals which are assigned to the wheels, wherein, for a wheel which is affected by a wheel signal failure, the corresponding wheel signal is obtained in the form of a substitute signal, and calculating a target brake pressure for a wheel at which an increase in brake pressure is necessary, in accordance with the wheel signal which is acquired for this wheel and in accordance with the determination as to whether this wheel is affected by a wheel signal failure.

The methods presented here can also comprise method steps which correspond to the functions of the devices and units which are described here.

A computer program with program code for carrying out the methods described here when the computer program is run on a processor unit is also specified.

A control unit or system comprised of a plurality of control units comprising at least one processor unit and at least one memory is also specified, wherein the at least one memory contains program code for carrying out the method presented here when said program code runs on the at least one processor unit.

BRIEF DESCRIPTION OF THE DRAWINGS

Further aspects, details and advantages of the present disclosure emerge from the following description of exemplary embodiments with reference to the figures, of which:

FIG. 4 shows the ABS according to FIG. 3 in a state without a wheel signal failure;

FIG. 5 shows the ABS according to FIG. 3 in a state with a wheel signal failure;

FIG. 6 shows a flow diagram of an exemplary embodiment of a method for operating the ABS according to FIG. 4;

DETAILED DESCRIPTION

Figure 1:
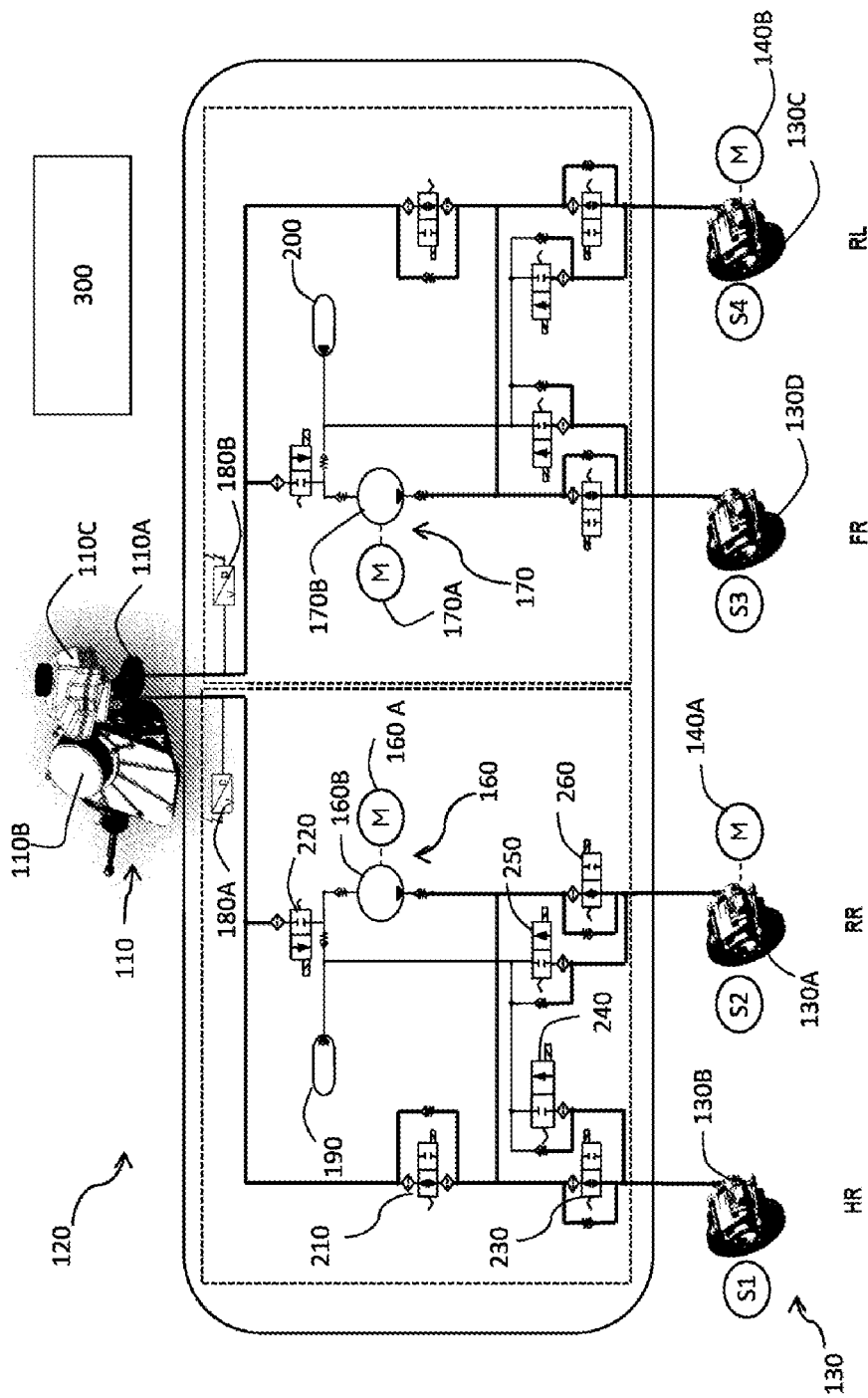
FIG. 1 shows an exemplary embodiment of a vehicle brake system.

FIG. 1 shows the hydraulic circuit diagram of an exemplary embodiment of a hydraulic vehicle brake system 100. It is to be noted that the teachings which are presented here and which relate to the failure of a wheel signal are not limited to a hydraulic brake system with the design illustrated in FIG. 1, but rather it is only intended to give an exemplary explanation here on the basis of this brake system.

The brake system 100 according to FIG. 1 comprises an assembly 110 which can be coupled to a brake pedal (not shown) and has the purpose of generating hydraulic pressure and a hydraulic control assembly 120 (also referred to as a hydraulic control unit, HCU) with two separate brake circuits I. and II. The brake system 100 also comprises four wheel brakes. Two of the four wheel brakes 130 are assigned to the brake circuit I., while the two other wheel brakes 130 are assigned to the brake circuit II. The assignment of the wheel brakes 130 to the wheel brakes I. and II. is carried out here according to a diagonal division such that the wheel brakes 130A and 130B on the right-hand rear vehicle wheel (RR) and respectively on the left-hand front wheel (FL) are assigned to the brake circuit I., while the wheel brakes 130C and 130D on the left-hand rear wheel (RL) and respectively on the right-hand front wheel (FR) are assigned to the brake circuit II. The wheel brakes 130 can alternatively also be distributed to the wheel brakes I. and II. on an axle basis.

The brake system 100 also comprises in the present exemplary embodiment an optional electric parking brake (EPB) with two electromechanical actuators 140A, 140B which can be electrically actuated separately from one another. In FIG. 1, the actuators 140A, 140B are each indicated only in the form of an electric motor. Of course, the actuators 140A, 140B can comprise further components, such as for example a transmission, via which the actuators 140A, 140B act, for example, on wheel brake cylinders.

The two actuators 140A, 140B are assigned differently to the four wheel brakes 130. Specifically, the actuator 140A is assigned to the wheel brake 130A of the right-hand rear wheel (RR), while the actuator 140B is assigned to the wheel brake 130C of the left-hand rear wheel (RL). In other variants, the two actuators 140A, 140B can also be assigned to the wheel brakes 130B, 130D of the right-hand front wheel (FR) and respectively of the left-hand front wheel (FL).

The assembly 110 for generating hydraulic pressure comprises a master cylinder 110A and can be operated according to the EBB principle and/or the BBW principle. This means that installed in the assembly 110 is an actuator which can be actuated electrically and is in the form of a hydraulic pressure generator 110B which is designed to boost or to generate a hydraulic pressure for at least one of the two brake circuits I. and II. This hydraulic pressure generator 110B comprises an electric motor which acts directly or indirectly on the master cylinder 110A in order to generate hydraulic pressure via a mechanical transmission. An indirect effect can occur, for example, in a hydraulic fashion (for example if the transmission acts on a plunger arrangement whose output is coupled hydraulically to an input of the master cylinder 110A).

The HCU 120 comprises a vehicle movement dynamics control system (also referred to as an ESC system), which is embodied with two circuits in the present example and has the purpose of carrying out closed-loop control interventions at the wheel brakes 130. In other exemplary embodiments, the vehicle movement dynamics control system can also be embodied in a known fashion with a single circuit.

Specifically, the two-circuit vehicle movement dynamics control system according to FIG. 1 comprises a first hydraulic pressure generator 160, which can be actuated electrically, in the first brake circuit I., and a second hydraulic pressure generator 170, which can be actuated electrically, in the second brake circuit II. Each of the two hydraulic pressure generators 160, 170 comprises an electric motor 160A, 170A as well as a pump 160B, 170B which can be actuated by the electric motor 160A, 170A. Each of the two pumps 160B, 170B can be embodied as a multi-piston pump, as a gear pump or as another type of pump. Each pump 160B, 170B shuts off counter to its delivery direction, as is illustrated by means of the shutoff valves at the output and the input of the pumps 160B, 170B. Since the rotational speed of each of the electric motors 160A, 170A can be adjusted, the delivery quantity of each of the pumps 160B, 170B can also be adjusted by correspondingly actuating the assigned electric motor 160A, 170A.

The two electric motors 160A, 170A—and therefore the two hydraulic pressure generators 160, 170—can be actuated independently of one another. This means that each of the two hydraulic pressure generators 160 and 170 can increase a hydraulic pressure independently of the other hydraulic pressure generator 170 or 160 in the respective brake circuit I. and II. This redundancy is an optional feature of the brake system 100, but is advantageous in terms of technical safety considerations.

The brake system 100 operates by means of a hydraulic fluid which is partially stored in three reservoirs 110C, 190, 200. While the reservoir 110C is a pressureless reservoir which forms part of the assembly 110, the two other reservoirs 190, 200 are each installed as pressure accumulators (e.g. as low pressure accumulators, LPA) in one of the two brake circuits I., II. The two hydraulic pressure generators 160 and 170 are each able to suck in hydraulic fluid from the assigned reservoir 190 or 200 or from the central reservoir 110C.

The reservoir 110C has a larger capacity than each of the two reservoirs 190, 200. However, the volume of the hydraulic fluid which is respectively stored in the two reservoirs 190, 200 is at least sufficient to be able to bring a motor vehicle safely to a standstill even when a brake pressure control operation is necessary at one or more of the wheel brakes 130 (e.g. in the case of ABS-assisted emergency braking).

The brake circuit I. comprises a hydraulic pressure sensor 180A which is arranged on the input side of the brake circuit I., in the region of its interface with the assembly 110. The signal of the hydraulic pressure sensor 180A can be evaluated in conjunction with actuation of the hydraulic pressure generator 110B, which is installed in the assembly 110, and/or of the hydraulic pressure generator 160 which is installed in the brake circuit I. The evaluation and actuation are carried out by means of a control unit system 300 which is only shown schematically in FIG. 1. In a corresponding way, a further hydraulic pressure sensor 180B is installed in the brake circuit II.

Furthermore, each wheel is assigned precisely one wheel sensor S (denoted by S1 to S4 in FIG. 1). The wheel sensors S are designed to generate a wheel signal indicating the rotational speed or velocity of the corresponding wheel. Wheel-related slip detection and slip control can also be carried out by the ABS on the basis of the wheel signals.

As shown in FIG. 1, the two brake circuits I. and II. are of identical design with respect to the components installed therein and the arrangement of these components. For this reason, only the design and the method of functioning of the first brake circuit I. are explained in more detail below.

In the brake circuit I., a multiplicity of valves are provided which can be activated by electromagnets and assume the basic positions illustrated in FIG. 1 when in the non-activated, that is to say electrically non-actuated state. In these basic positions, the valves connect the assembly 110, in particular the master cylinder 110A, to the wheel brakes 130. Therefore, even when there is a loss of function (e.g. a failure) of the energy supply and an associated failure of the hydraulic pressure generator 110B, a hydraulic pressure can still be increased at the wheel brakes 130 by the driver by means of the brake pedal which acts on the master cylinder 110A. However, in the case of an EBB implementation, this hydraulic pressure is in fact not boosted, or in the case of a BBW implementation mechanical coupling of the brake pedal to the master cylinder 110A occurs (push-through, PT operation). In the BBW operation, the master cylinder 110A is, on the other hand, fluidically decoupled from the brake circuit I. in a known fashion.

The multiplicity of valves comprises two 2/2-way valves 210, 220 which permit decoupling of the two wheel brakes 130A and 130B from the assembly 110. Specifically, the valve 210 is provided to uncouple, in the electrically actuated state, the wheel brakes 130A, 130B from the assembly 110 if a control intervention at at least one of the two wheel brakes 130A, 130B is carried out by means of the hydraulic pressure generator 160. In its electrically actuated state, the valve 220 makes it possible for the hydraulic fluid to be sucked in or continue to be sucked in from the reservoir 110C (e.g. in the case of a persistent control intervention, if the reservoir 190 is completely emptied in the process). In addition, in this electrically actuated state, a reduction in pressure at the wheel brakes 130A, 130B is possible by making it possible for hydraulic fluid to flow back from the wheel brakes 130A, 130B into the pressureless reservoir 110C.

The hydraulic connection of the wheel brake 130A, 130B to the assembly 110 and to the hydraulic pressure generator 160 is determined by four 2/2-way valves 230, 240, 250, 260 which assume the basic positions illustrated in FIG. 1 in the non-activated, that is to say electrically non-actuated state. This means that the two valves 230 and 260 each assume their open position while the two valves 240 and 250 each assume their closed position. The two valves 230 and 240 form a first valve arrangement which is assigned to the wheel brake 130B, while the two valves 250 and 260 form a second valve arrangement which is assigned to the wheel brake 130A.

As explained below, the two valves 210 and 220, the two valve arrangements 230, 240 and respectively 250, 260 and the hydraulic pressure generator 160 are each designed to be actuated for wheel brake pressure control interventions at the respective wheel brake 130A, 130B. The actuation of the two valves 210 and 220, of the two valve arrangements 230, 240 and respectively 250, 260 and of the hydraulic pressure generator 160 within the scope of the control interventions is carried out by means of the control unit system 300. The control unit system 300 implements, for example, the wheel brake pressure control interventions of a vehicle movement dynamics control system, wherein the vehicle movement dynamics control system according to the present disclosure comprises at least one anti-lock brake control system (ABS). In addition, a traction control system (TCS) and/or an electronic stability program (EPB) and/or a brake pressure control system for an adaptive cruise control (ACC) system can also be included therein.

An anti-lock brake control operation is intended to prevent locking of the wheels during a braking operation. This requires the hydraulic pressure in the wheel brakes 130A, 130B to be modified individually in accordance with the prevailing wheel slip. As mentioned above, in order to determine the wheel slip the signals to the wheel sensors S1 to S4 are evaluated (more on this later). The ABS pressure modulation is carried out by adjusting pressure-increasing phases, pressure-maintaining phases and pressure-reducing phases which alternate in a chronological sequence and result from suitable actuation of the valve arrangements 230, 240 and respectively 250, 260 which are assigned to the two wheel brakes 130B and 130A, and, if appropriate, of the hydraulic pressure generator 160.

During a pressure-increasing phase, the valve arrangements 230, 240 and respectively 250, 260 each respectively assume their basic position so that the brake pressure in the wheel brakes 130A, 130B can be increased (as in the case of a BBW braking operation) by means of the hydraulic pressure generator 160. For a pressure-maintaining phase at one of the wheel brakes 130B and 130A, just the valve 230 or respectively 260 is actuated, that is to say is moved into its locking position. Since the valve 240 or respectively 250 is not actuated, it remains in its closed position. As a result, the corresponding wheel brake 130B or 130A is decoupled hydraulically, so that a hydraulic pressure which occurs in the wheel brake 130B or respectively 130A is kept constant. In a pressure-reducing phase, both the valve 230 or respectively 260 and the valve 240 or respectively 250 is actuated, that is to say the valve 230 or respectively 260 is moved into its closed position and the valve 240 or respectively 250 is moved into its open position. Therefore, hydraulic fluid can flow away from the wheel brake 130B or respectively 130A in the direction of the reservoirs 110C and 190, in order to reduce a hydraulic pressure which is present in the wheel brake 103A or respectively 130B.

Other control interventions in the normal service braking mode occur in an automated fashion and typically independently of an activation of the brake pedal by the driver. Such automated control operations of the wheel brake pressure occur, for example, in conjunction with a traction control operation which prevents individual wheels spinning during a starting process by targeted braking, a vehicle movement dynamics control system in the narrower sense, which system adapts the vehicle behavior in the boundary region to the driver's request and the roadway conditions through targeted braking of individual wheels, or an adaptive cruise control operation which maintains a distance between the driver's vehicle and a vehicle traveling ahead, inter alia by automatic braking.

When an automatic hydraulic pressure control operation is carried out, a hydraulic pressure can be increased at at least one of the wheel brakes 130A or respectively 130B by actuating the hydraulic pressure generator 160. In this context, the valve arrangements 230, 240 and respectively 250, 260 which are assigned to the wheel brakes 130B, 130A of the hydraulic pressure generator 160 firstly assume their basic positions illustrated in FIG. 1. Fine adjustment or modulation of the hydraulic pressure can be carried out by corresponding actuation of the hydraulic pressure generator 160 and of the valves 230, 240 and respectively 250, 260 which are assigned to the wheel brakes 130B and respectively 130A, as is explained by way of example above in conjunction with the ABS control operation.

The hydraulic pressure control is carried out by means of the control unit system 300, generally in accordance with, on the one hand, parameters which are acquired by sensor and which describe the vehicle behavior (e.g. wheel speeds of the sensors S1 to S4, yaw rate, transverse acceleration, etc.) and, on the other hand, parameters which are acquired by sensor (e.g. activation of the brake pedal, steering wheel angle, etc.) and which describe the driver's request, insofar as they are present. A deceleration request of the driver can be determined, for example, by means of a travel sensor which is coupled to the brake pedal or to an input element of the master cylinder 110A. In addition or as an alternative, the brake pressure which is generated in the master cylinder 110A by the driver can be used as a measurement variable which describes the driver's request, said brake pressure then being sensed by means of the sensor 180A (and the corresponding sensor 180B assigned to the brake circuit II.), and if appropriate its plausibility is checked. The deceleration request can also be initiated by a system for autonomous or partially autonomous driving.

Figure 2:
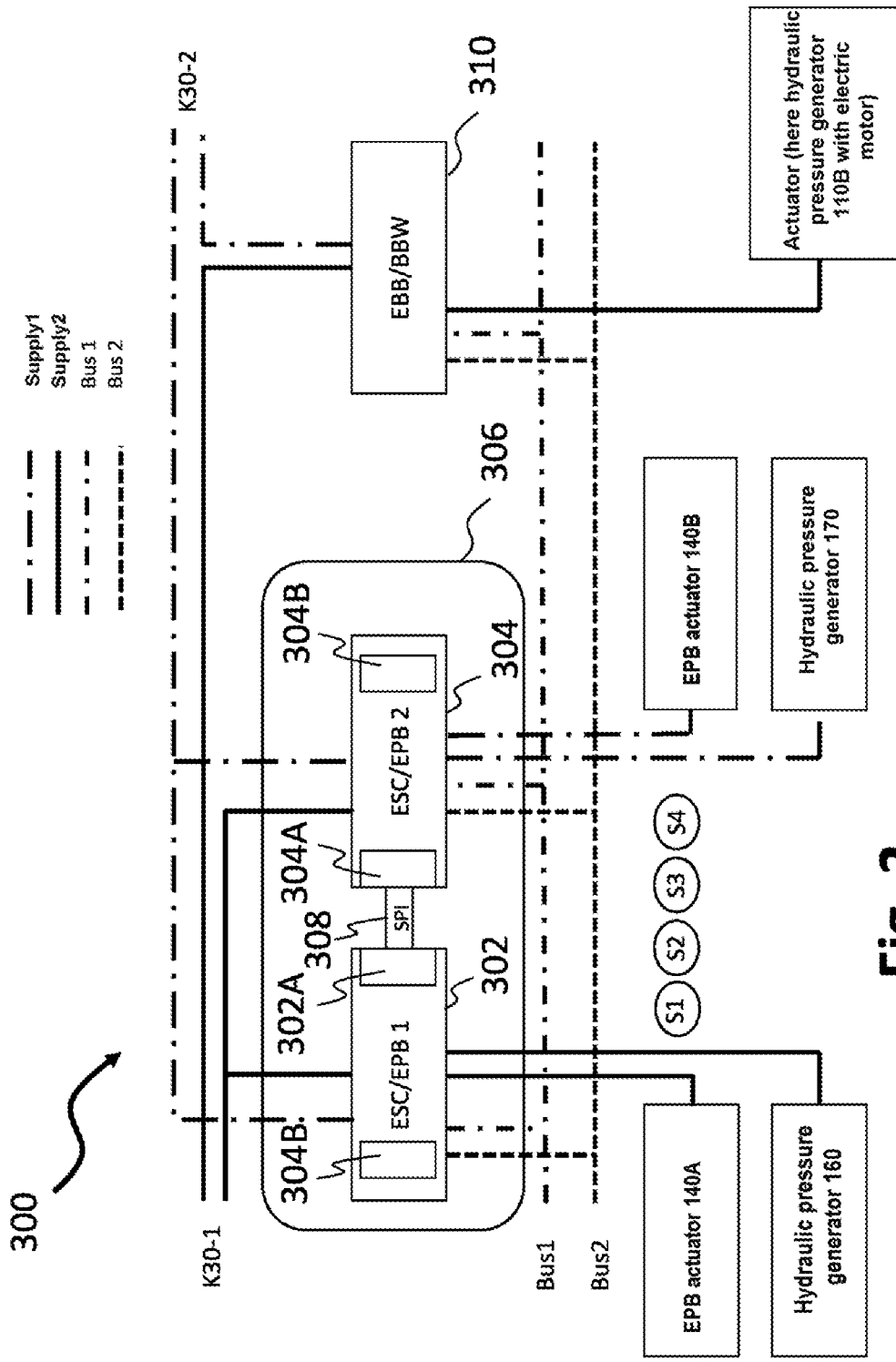
FIG. 2 shows an exemplary embodiment of a control unit system for the brake system according to FIG. 1.

FIG. 2 shows an exemplary embodiment of the control unit system 300 from FIG. 1. As illustrated in FIG. 2, the control unit system 300 comprises a first control unit 302 which is designed to actuate the hydraulic pressure generator 160 and the EPB actuator 140A, and a second control unit 304 which is designed to actuate the hydraulic pressure generator 170 and the EPB actuator 140B. As explained in conjunction with FIG. 1, this actuation can take place on the basis of a multiplicity of measurement variables which are acquired by sensor. In another exemplary embodiment, the two control units 302 and 304 can also be combined to form a single control unit, in particular in a single-circuit configuration of the vehicle movement dynamics control system.

In the exemplary embodiment according to FIG. 2, the two control units 302 and 304 are embodied as a spatially coherent control unit device 306. In this way, the two control units 302 and 304 can be accommodated in a common housing but comprise separate processors 302A, 304A for processing the measurement variables and for actuating the respectively assigned components 140A, 160 and respectively 140B, 170 and separate memories 302B, 304B. In order to exchange data, for example in relation to the plausibility checking of measurement variables and/or actuation signals, the corresponding processors 302A, 304A of the two control units 302, 304 are communicatively connected to one another via a processor interface 308. The processor interface 308 is embodied in the exemplary embodiment as a serial-parallel interface (SPI).

The control unit system 300 also comprises a third control unit 310 which is designed to actuate the hydraulic pressure generator 110B installed in the assembly 310, and therefore, in particular the electric motor of said hydraulic pressure generator 110. Depending on the configuration of the brake system 100, this actuation can take place according to the EBB principle or the BBW principle. The control unit 310 can form a spatially coherent control unit device with the two other control units 302 and 304 or else can be provided spaced apart therefrom. In one implementation, a housing of the control unit 310 is integrated into the assembly 110. In a system for autonomous or partially autonomous driving, the control unit system 300 can comprise a further control unit (not illustrated in FIG. 2) which implements the corresponding functions.

As shown in FIG. 2, in the present exemplary embodiment two parallel electrical supply systems K30-1 and K30-2 are provided (in other exemplary embodiments, in particular in a single-circuit configuration of the vehicle movement dynamics control system just a single of these supply systems K30-1 and K30-2 could be present). Each of these two supply systems K30-1 and K30-2 comprises a voltage source (not illustrated) as well as associated voltage supply lines. In the exemplary embodiment according to FIG. 2, the supply system K30-1 is designed to supply the EPB actuator 140A and the hydraulic pressure generator 160, while the parallel supply system K30-2 is designed to supply the other EPB actuator 140B and the hydraulic pressure generator 170. In another exemplary embodiment, the EPB actuator 140A and the hydraulic pressure generator 160 could additionally (that is to say in a redundant fashion) be capable of being supplied by the supply system K30-2, and the EPB actuator 140B and the hydraulic pressure generator 170 could additionally be capable of being supplied by the supply system K30-1. In this way, the system redundancy is increased further.

Each of the three control units 302, 304 and 310 (as well as an optional control unit for autonomous or partially autonomous driving) is supplied in a redundant fashion both via the supply system K30-1 and via the supply system K30-2. For this purpose, each of the control units 302, 304, 310 can be provided with two separate supply connections which are each assigned to one of the two supply systems K30-1 or respectively K30-2.

As is also illustrated in FIG. 2, two parallel communication systems Bus1 and Bus2 are provided in a redundant fashion and are each embodied in the exemplary embodiment as a vehicle bus (e.g. according to the CAN or LIN standard). The three control units 302, 304 and 310 (as well as an optional control unit for autonomous or partially autonomous driving) can communicate with one another via each of these two communication systems Bus1, Bus2. In another exemplary embodiment, just a single bus system (e.g. Bus1) could be provided.

The wheel sensors S1 to S4 (and if appropriate the further sensors) are also connected to at least one of the two supply systems K30-1 and K30-2 as well as at least one of the two communication systems Bus1 and Bus2. In this way, the control units 302, 304 are supplied with wheel signals for the ABS implemented therein (and for possible further ESC functions which are implemented therein).

In the exemplary embodiment according to FIG. 2, the actuation of the components 140A, 160 and 140B, 170 is carried out by means of the two control units 302 and 304, and the actuation of the hydraulic pressure generator 110B which is installed in the assembly 110 is carried out by means of the control unit 310 (or by means of the optional control unit for autonomous or partially autonomous driving) in such a way that the corresponding control unit 302, 304, 310 activates or deactivates and, if appropriate, modulates the power supply for the corresponding component (e.g. by means of pulse width modulation). In another exemplary embodiment, one or more of these components, in particular the EBP actuators 140A, 140B can be connected to one or both of the communication systems Bus1, Bus2. In this case the actuation of these components by means of the assigned control unit 302, 304, 310 is then carried out via the corresponding communication system Bus1, Bus2. In addition, in this case the corresponding component can be continuously connected to one or both of the supply systems K30-1, K30-2.

Figure 3:
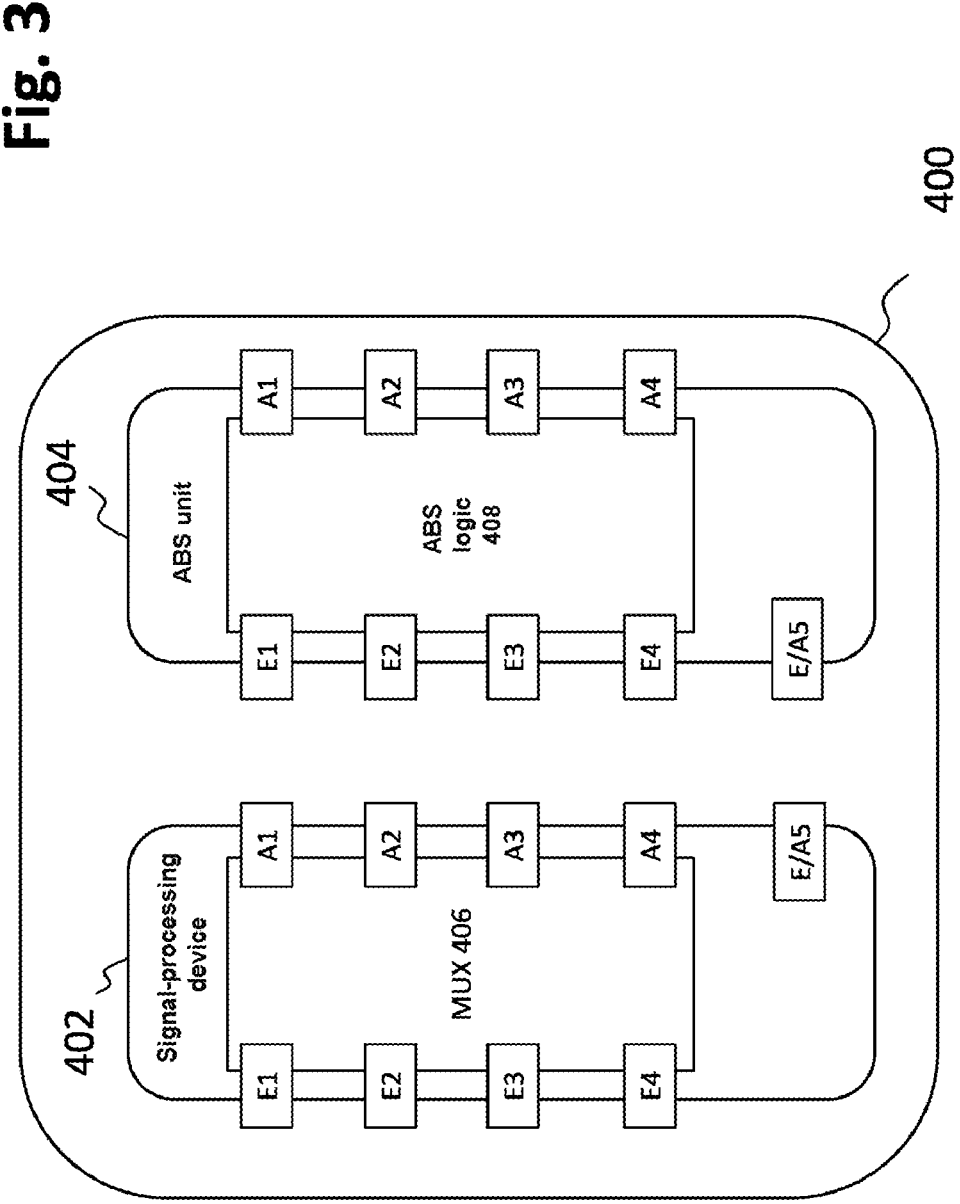
FIG. 3 shows an exemplary embodiment of an ABS for the brake system according to FIG. 1.

FIG. 3 shows an exemplary embodiment of an implementation of an ABS 400, which can be integrated into the control unit system 300 of the brake system 100 according to FIG. 1 or a control unit or control unit system which is configured in some other way.

If the control unit system 300 comprises two separate control units 302 and 304 with an independent ESC functionality (cf. FIG. 2), each of the control units 302 and 304 can comprise the ABS 400 according to FIG. 3 in a redundant fashion. As an alternative, it would also be conceivable that each of the two control units 302 and 304 implement just one part of the ABS 400 for those two wheels which are assigned to the corresponding control unit 302, 304. Another type of implementation of the ABS 400 or a modified form thereof is conceivable in conjunction with the control unit system 300 illustrated in FIG. 2.

As illustrated in FIG. 3, the ABS 400 comprises a signal-processing device 402 and an ABS unit 404. The signal-processing device 402 comprises four inputs E1 to E4 for wheel signals and four outputs A1 to A4, also for wheel signals. The inputs E1 to E4 of the signal-processing device 402 are connected to, in each case, one of the wheel sensors S1 to S4 via a communication system (for example via the two parallel communication systems Bust and Bust according to FIG. 2).

In FIG. 3, the four inputs E1 to E4 of the signal-processing device 402 are illustrated as four logically separate inputs. Of course, these four logic inputs E1 to E4 can be mapped onto a single physical input (connection). This applies in a corresponding way for the four outputs A1 to A4 of the signal-processing device 402.

The four inputs E1 to E4 and the four outputs A1 to A4 of the signal-processing device 402 are coupled to one another via a multiplexer 406. The multiplexer 406 permits any input E1 to E4 to be coupled to any of the outputs A1 to A4. Any of the inputs E1 to E4 can also be coupled to two or more outputs A1 to A4. In one development, the multiplexer 406 is also capable of processing the wheel signals which are received via the inputs E1 to E4 (for example of mixing them) and of outputting one or more signals which have been processed in this way via one or more of the outputs A1 to A4. For example, the wheel signals which are acquired by means of a plurality of the inputs E1 to E4 can therefore be processed with different weighting to form a new wheel signal and fed to one or more of the outputs A1 to A4.

It is basically the case that the signal-processing device 402 is designed to receive wheel signals via the inputs E1 to E4 and to output signals via the outputs A1 to A4. The signals which are output also constitute wheel signals from the point of view of the ABS unit 404, even though they can differ from the wheel signals received by the signal-processing device 402, owing to the operations of the multiplexer 406.

The signal-processing device 406 comprises a further input/output interface A/E5, in order to be able to communicate with the ABS unit 404. The ABS unit comprises for this purpose a complementary input/output interface E/A5.

The ABS unit also comprises four inputs E1 to E4 which can be coupled to the corresponding outputs A1 to A4 of the signal-processing device 402. Via these inputs E1 to E4, the ABS unit 404 accordingly receives signals which, from the point of view of the ABS unit 404, are each assigned to one of the wheels at which the corresponding wheel sensor S1 to S4 is installed. In other words, the ABS unit 404 assigns one of the wheel sensors S1 to S4 to each of its inputs E1 to E4.

The ABS unit 404 also comprises an ABS logic 408. The ABS logic 408 is designed to subject wheel signals received via the inputs E1 to E4 to ABS processing. This ABS processing comprises, for example, calculating a wheel slip, detecting the exceeding of a slip threshold by a specific wheel and carrying out an ABS control operation at the wheel which exceeds the slip threshold. This slip control includes calculating actuation signals for ABS pressure modulation related to one wheel, as is explained with reference to the valve arrangements and hybrid pressure generators illustrated in FIG. 1. The corresponding actuation signals are output by the ABS unit 404 via corresponding outputs A1 to A4.

As has already been explained in relation to the signal-processing device 402, the inputs E1 to E4 and the outputs A1 to A4 of the ABS unit 404 are logic inputs or logic outputs which can be implemented by means of one or more physical inputs or outputs.

FIG. 4 shows an operating state of the ABS 400 in a fault-free state of the brake system 100. The fault-free state means here that a wheel signal from each of the wheel sensors S1 to S4 is respectively present at the corresponding input E1 to E4 of the signal-processing device 402. The wheel signal which is present at the respective input E1 to E4 is passed on from the multiplexer 406 to the corresponding output A1 to A4 of the signal-processing device 402 without further processing and is output to the corresponding input E1 to E4 of the ABS unit 404. The ABS logic 408 processes the wheel signals in a known fashion in order to detect slip and, if necessary, to control slip. If the need to perform slip control is detected at one or more of the vehicle wheels, corresponding actuation signals are output via one or more of the outputs A1 to A4 of the ABS unit 404. The actuation signals which are output then bring about ABS pressure modulation at the assigned wheel brake 130A to 130D.

In the fault-free state of the brake system 100 no communication is necessary between the signal processing device 402 and the ABS unit 404 via the interfaces E/A5.

FIG. 5 illustrates the operation of the ABS 400 in the event of a failure of a wheel signal. Specifically, in the example illustrated in FIG. 5 it is assumed that the wheel signal of the wheel sensor S1 which is assigned to the left-hand front wheel FL has failed. The failure of the wheel signal of the wheel sensor S1 may be attributable to a failure of this sensor S1 itself or can have other reasons (for example the interruption of a signal-transmission line between the wheel sensor S1 and the input E1 of the signal-processing device 402).

It is explained below, with reference to the flowchart 600 according to FIG. 6, how the signal-processing device 402 reacts to the failure of the wheel signal of the wheel sensor S1.

In a first step 602, the signal-processing device 402 detects the failure of the wheel signal at the input E1. At the same time it is detected that wheel signals from the assigned sensors S2 to S4 continue to be detected at the remaining inputs E2 to E4. The detected failure of the wheel signal of the wheel sensor S1 can be communicated to the ABS unit 404 by means of a communication in the form of a failure signal via the interfaces E/A5.

In a subsequent step 604, the multiplexer 606 forms a substitute signal for the failed wheel signal using the signal of at least one of the sensors S2 to S4, from which wheel signals are still received (which are therefore respectively assigned to the right-hand rear wheel RR which is not affected by the failure, right-hand front wheel FR and left-hand rear wheel RL). Signals of other sensors which are installed in the vehicle can also be used to generate the substitute signal.

The substitute signal can be formed in different ways. In the present exemplary embodiment according to FIG. 5, the formation of the substitute signal comprises making a selection among the wheel signals of those sensors S2 to S4 which are assigned to the wheels RR, FR and RL which are not affected by the failure. Specifically, in the example according to FIG. 5 the wheel signal of the wheel sensor S2 which is assigned to the right-hand rear wheel RR is selected. The multiplexer 406 subsequently copies the wheel signal which is supplied by the wheel sensor S2 to the output A1. In other words, the substitute signal corresponds to the wheel signal which is supplied by the sensor S2 and is output at the output A1 of the signal-processing device 402 as a regular wheel signal of the sensor S1.

In other implementations, the substitute signal can be based decisively on the selected wheel signal (here the wheel signal of the wheel sensor S2) but can deviate therefrom somewhat. Therefore, the multiplexer 406 can mix, for example, a portion of one or more of the wheel signals of the wheel sensors S3 and S4 with the wheel signal of the wheel sensor S2 in such a way that the resulting substitute signal is still decisively based on the wheel signal of the wheel sensor S2.

In a further step 606, the substitute signal can be fed via the output A1 of the signal-processing device 402 to the input E1 of the ABS unit 404. From the point of view of the ABS unit 404 the substitute signal which is obtained via the input E1 is a "normal" wheel signal of the wheel sensor S1 since it has been obtained via the input E1.

Accordingly, despite the wheel signal failure with respect to the sensor S1, the ABS unit 404 receives, at all four inputs E1 to E4, a wheel signal which is assigned to that wheel which is in turn assigned to the corresponding input E1 to E4. As explained above, the wheel signal which is received at the input E1 is, however, a substitute signal for the wheel signal which is affected by the failure. The failure of the wheel signal for the wheel which is assigned to the sensor S1 can be communicated to the ABS unit 404 via the interfaces E/A5 (however, such a communication can also be dispensed with).

On the basis of the wheel signals received via the inputs E1 to E4, the ABS logic 408 carries out a slip detection and, if necessary, a slip control. According to the example illustrated in FIG. 5, the ABS logic 408 arrives at the conclusion that in each case a slip control intervention is necessary at the wheel brakes 130B and 130A. Accordingly, corresponding actuation signals are output via the outputs A1 and A2 of the ABS unit 404.

According to the exemplary embodiment illustrated in FIG. 5, an individual wheel sensor error can be compensated by suitable substitution with a wheel signal, still present, of another wheel sensor. In the simplest case, therefore, as illustrated in FIG. 5, a selected wheel signal is "copied" onto the wheel signal which is affected by the failure so that the ABS unit 404 can continue to be operated in an unchanged form or with only few adaptations. Of course, the substitute signal does not necessarily have to be a copy of one of the remaining wheel signals but rather it is also possible to carry out relatively complex processing operations in the multiplexer 406 in order to obtain the substitute signal. These further processing operations can be based on a plurality of the wheel signals which are still present and/or on additional sensor signals (such as for example a longitudinal acceleration, a transverse acceleration, a yaw rate, a steering angle and/or a main cylinder pressure). Such an additional sensor system can also be used by the ABS logic 408 in order to improve, on the basis of the substitute signal, the ABS control behavior at the wheel which is affected by the failure. With such a configuration it is then necessary for the signal-processing device 402 to inform the ABS unit 404 about the wheel which is affected by the signal failure.

A coefficient of friction of the roadway is determined for each wheel by means of the wheel speeds or the yaw rate or both. In this way, in particular different coefficients of friction of the roadway on different sides of the vehicle can be detected (i.e. a split µ detection can be carried out). The intention is that despite the use of the substitute signal it will continue to be possible to take into account different coefficients of friction of the roadway, and therefore a split µ situation, in conjunction with the ABS control. Exemplary selection strategies for an unknown or homogenous underlying surface, on the one hand, and in the case of a detected split µ situation, on the other, will now be explained in relation to FIGS. 7A to 7D, and respectively FIGS. 8A to 8D.

FIGS. 7A to 7D show wheel signal selection strategies in the case of a homogenous underlying surface (that is to say the same coefficient of friction of the roadway on both sides of the vehicle) or in the case of an unknown underlying surface (that is to say if, for example, for technical or other reasons, no split µ detection can be carried out).

In these cases, the wheel signals are essentially replaced for each side. Therefore, if according to FIGS. 7A and 7B the wheel signal which is assigned to a rear wheel is affected by the failure, the failed wheel signal is generated on the basis of the wheel signal of the rear wheel which lies opposite the wheel affected by the failure.

Since the wheel signals for the wheels of the front axle are still present, a split µ detection can be carried out on the basis of these wheel signals. The split µ detection can be carried out either by the signal-processing device 402 or by the ABS unit 404 or by both of these components independently. If the split µ detection is carried out by the ABS unit 404, the result of this detection can be communicated to the signal-processing device 402 via the interfaces E/A5. The selection of the wheel signals "to be coped" in relation to the generation of substitute signals can then be made by the signal-processing device 402 on the basis of this communication.

If signals are present from other sensors which point, for example, to the yaw rate, the longitudinal acceleration, the transverse acceleration or the steering angle, this information can be additionally used for the split µ detection.

Figure 7D:
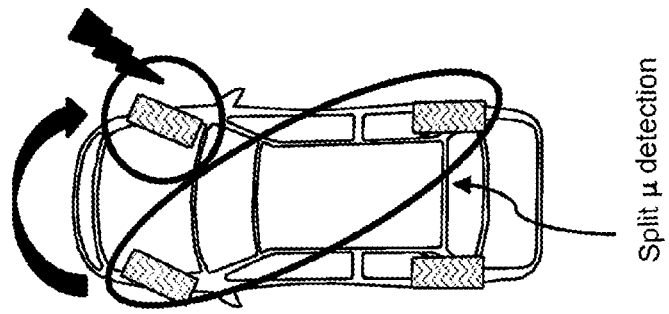
FIGS. 7A-D show various exemplary embodiments for generating a substitute signal in the case of a wheel signal failure without a split μ situation.
Figure 7C:
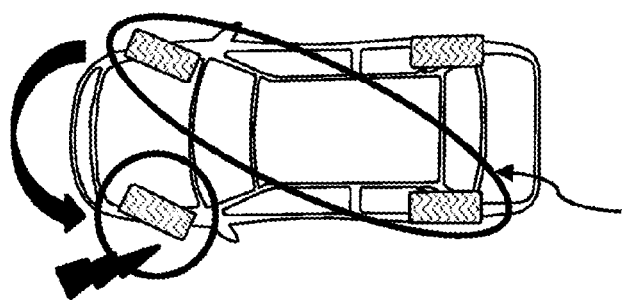
Figure 7B:
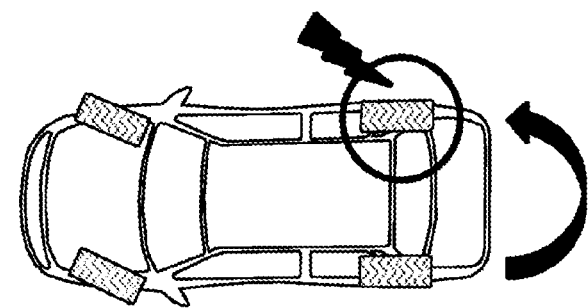
Figure 7A:
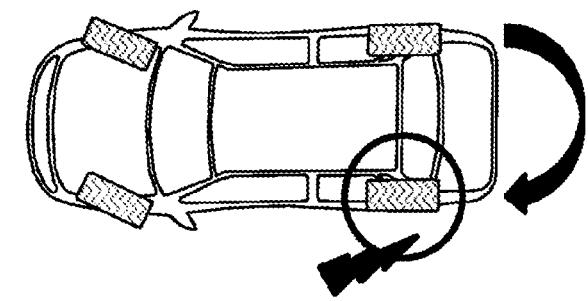

If as illustrated in FIGS. 7C and 7D, the wheel signal for a front wheel fails when the coefficient of friction of the roadway is unknown or homogenous, the wheel signal of the front wheel which respectively lies opposite is also used to form the substitute signal (e.g. is copied). However, a conventional split µ situation can then no longer be detected since there is then only a single wheel signal available at the front axle. Therefore, the wheel diagonals, as also illustrated in FIGS. 7C and 7D, are used for the split µ detection as a compensation for the failed front wheel signal. Specifically, the split µ detection is carried out on the basis of the wheel signals of sensors which are assigned to a front wheel not affected by a failure and a rear wheel lying diagonally opposite this front wheel. Signals from further sensors can also be used again here to improve the split µ detection.

If a split µ situation has been detected, the wheel signal selection strategy is correspondingly adapted, as illustrated in FIGS. 8A to 8D.

Figures 8A, 8B, 8C, 8D:
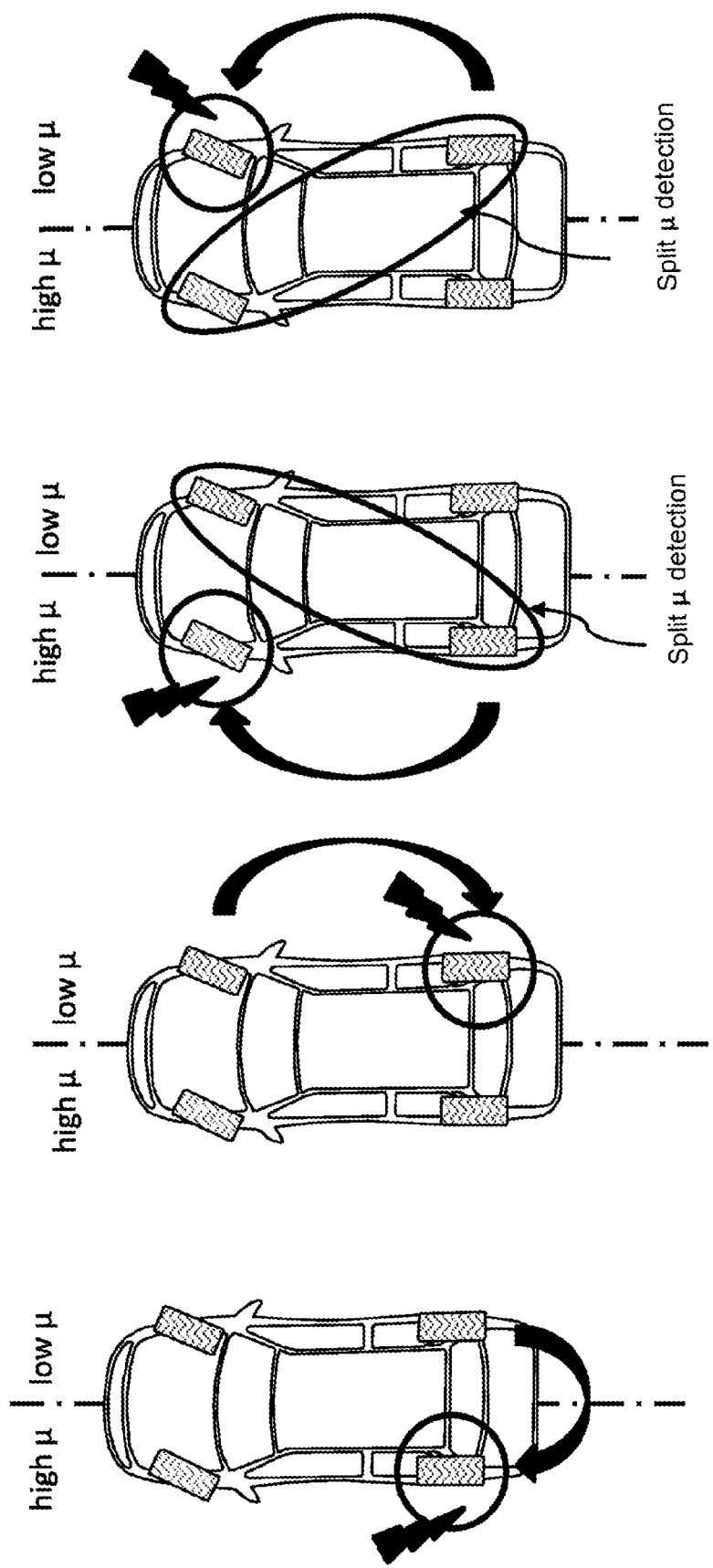
FIGS. 8A-D show various exemplary embodiments for generating a substitute signal in the case of a wheel signal failure in a split μ situation.

FIG. 8A illustrates the case in which a wheel signal for a rear wheel on the side with the high coefficient of friction has failed. In this split µ situation, the wheel signal from the rear wheel on the side of the low coefficient of friction is used to form the substitute signal. In an ABS control process a select low control strategy can be activated for the rear axle, wherein this control strategy is actually intended for unknown or homogenous surfaces. According to the principle of the "select low", the brake pressure at the two rear wheels is controlled in a corresponding way, wherein as a principle for the control, that rear wheel is used at which the slip is greatest (or generally which has the greatest tendency to lock). In order to check the plausibility of the split µ situation further, it is also possible to have recourse to the wheel signals of the front axle. Plausibility checking is intended to mean here that it is continuously checked whether the split µ situation which has been previously detected persists. If this is no longer the case, there can be recourse to one of the scenarios according to FIGS. 7A to 7D.

FIG. 8B illustrates the case in which the wheel signal for a rear wheel on the side with the low coefficient of friction is affected by the failure. In this case, the wheel signal of a front wheel on the side with the low coefficient of friction is used to form the substitute signal. Further plausibility checking of the split µ situation can be carried out again by means of the wheel signals received for the front axle.

In the scenario according to FIG. 8C, the failure of a wheel signal for a front wheel on the side with the high coefficient of friction is assumed. In this case, the wheel signal for the wheel which would have to apply the main braking torque has failed. The substitute signal is then formed on the basis of the wheel signal of the rear wheel on the same side. Furthermore, in order to obtain minimum deceleration at the rear axle an individual control process is activated, insofar as it is necessary (the brake pressure is therefore set on a wheel-specific basis). In order to increase the braking capacity at the wheel which is affected by the failure of the wheel signal, a yaw-rate-dependent stability control process can be carried out, at any rate for as long as a yaw rate signal is present. In this context, the maximum brake pressures on the side with the high coefficient of friction can be suitably limited so that an onset of slip is improbable. Further plausibility checking of the detected split µ situation can be carried out by means of the diagonal indicated in FIG. 8C (front wheel on the side with a low coefficient of friction and rear wheel on the side with a high coefficient of friction).

Finally, FIG. 8D illustrates the failure of the wheel signal for a front wheel on the side with a low coefficient of friction. In this case, the substitute signal for the front wheel is determined on the side with a low coefficient of friction by the wheel signal for the rear wheel on the same side on the side with the low coefficient of friction. The diagonal which is indicated in FIG. 8D, that is to say the wheel signals for the front wheel on the side with the high coefficient of friction and the rear wheel on the side with the low coefficient of friction can then be used again for further plausibility checking of the split µ situation.

In addition, the wheel selection strategies for forming the substitute signal have to be mirrored if, in contrast to the situation indicated in FIGS. 8A to 8D, the right-hand side of the vehicle is the side with the high coefficient of friction and the left-hand side of the vehicle is the side with the low coefficient of friction.

The precise coefficient of friction of the underlying surface of a wheel affected by a wheel signal failure can always be estimated on the basis of the known coefficient of friction of the remaining three wheels. For this reason, it is appropriate, to be on the safe side, to reduce the probability of unnoticed locking of the wheel which is affected by the failure of the wheel signal. For this purpose, the increase in the brake pressure at the wheel for which a wheel signal failure has been determined can be suitably adapted. In particular, a brake pressure control strategy can be provided for increasing the safety margin between the wheel with the known coefficient of friction on the basis of which the substitute signal has been generated, and the wheel with the unknown coefficient of friction which is affected by the wheel signal failure.

Figure 9:
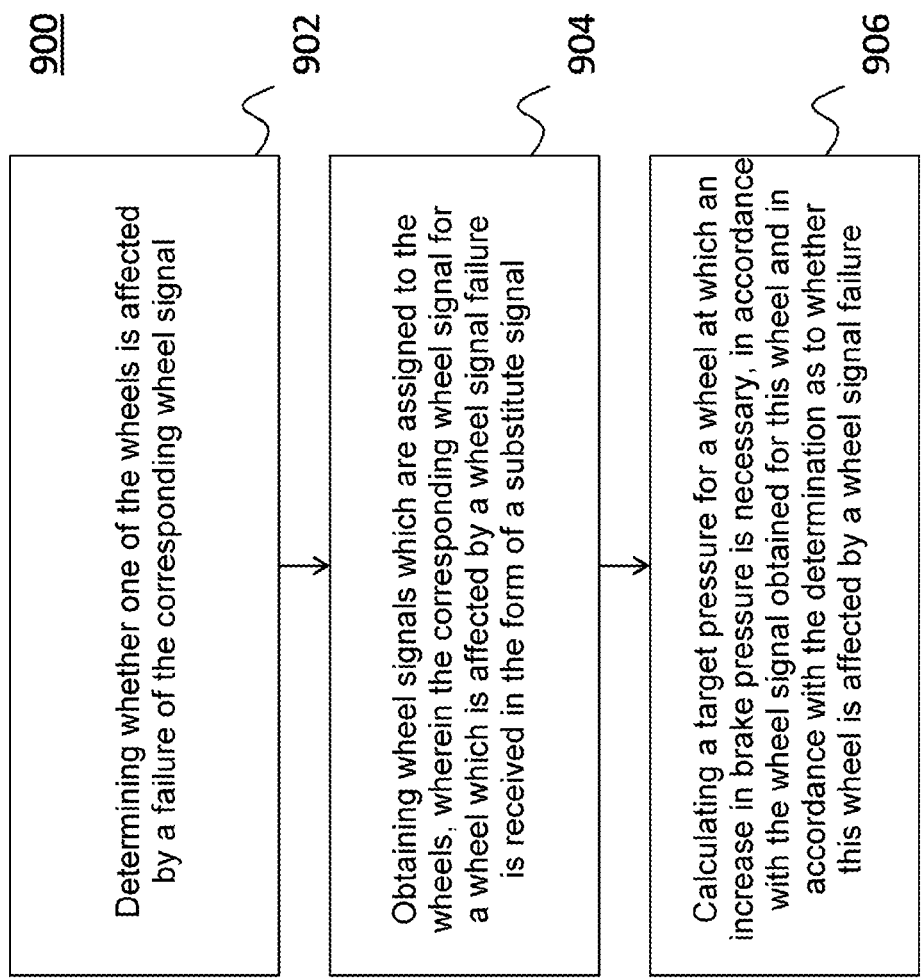
FIG. 9 shows a flow diagram of an exemplary embodiment of a further method for operating the ABS according to FIG. 4.

FIG. 9 illustrates in this context a flowchart 900 for a method which can be carried out by means of the ABS 400 according to FIG. 4 and, in particular, by the ABS unit 404. In addition or as an alternative, the corresponding method can also be implemented in an EBB or EBW control unit (cf. for example reference symbol 310 in FIG. 2). In other words, the method is not limited to execution in conjunction with an ABS-assisted braking operation.

The method starts in step 902 with the determination as to whether one of the wheels is affected by a failure of the corresponding wheel signal. If the method is carried out by the ABS unit 404, the determination can be carried out on the basis of a failure signal which the ABS unit 404 has received from the signal-processing device 402 via the interfaces E/A5 (cf. the corresponding arrow in FIG. 5).

Furthermore, wheel signals for all the wheels are received in step 904, wherein the corresponding wheel signal for a wheel which is affected by a wheel signal failure is received in the form of a substitute signal. In the scenario illustrated in FIG. 5, a substitute signal is therefore received for the left-hand front wheel from the wheel sensor S2.

The steps 902 and 904 can be carried out in any desired sequence. In other words, the step 904 could also precede the step 902, or the two steps 902 and 904 could be carried out simultaneously.

In a further step 906, a target pressure for a wheel at which an increase in brake pressure is necessary is calculated. The increase in brake pressure can be carried out for a normal service braking operation, an ABS-assisted service braking operation or an emergency braking operation (with or without ABS assistance). Specifically, the increase in brake pressure takes place in accordance with the wheel signal which is obtained for this wheel, on the one hand, and in accordance with the determination as to whether this wheel is affected by a wheel signal failure, on the other. In this context, if the wheel at which the increase in brake pressure is necessary is affected by the wheel signal failure, a lower target brake pressure can be provided than if this wheel were not affected by the wheel signal failure.

For example, a prescribed pressure difference between the wheel for which a wheel signal failure was determined and the wheel whose wheel signal forms the basis for the calculation of the substitute signal ("comparison wheel") can be set. The pressure difference can be provided in such a way that the wheel braking torque at the wheel which is affected by the wheel signal failure always remains a little lower than the wheel braking torque at the comparison wheel. In this way, a safety margin is introduced which makes it less probable that the wheel affected by the wheel signal failure will lock without being noticed. The pressure difference can be set in such a way that the further increase in pressure at the wheel affected by the wheel signal failure is set in a suitable way to set the target pressure only starting from a certain vehicle deceleration or a certain wheel brake pressure.

A pressure difference which results from the brake pressure difference at the wheels which are assigned to a specific vehicle axle brings about a difference in wheel braking torque at these wheels, as a result of which the vehicle could pull on one side. The degree of this pulling on one side depends on the difference in wheel braking torque. An appropriate variable for the difference in wheel torque, and therefore the difference in hydraulic pressure, can be made dependent on the availability of other sensors (for example of a yaw rate sensor, of a transverse acceleration sensor, etc.). If the corresponding signals from one or more other sensors (in addition to the wheel signals) are present, a greater difference in brake pressure can be set. Pulling of the vehicle to one side, which occurs in this context, can also possibly be pilot controlled by known strategies such as straight line braking (SLB), at the axle which is not affected by the wheel signal failure. On the other hand, if the further sensor signals are not available, a correspondingly smaller difference in hydraulic pressure can be set in order to be able to make the situation easier to cope with.

In order to increase the safety margin in the case of an ABS-assisted braking operation, the slip threshold of the wheel affected by the wheel signal failure can, to be on the safe side, be reduced by a certain absolute amount or factor in comparison with the wheel on the same axle. This procedure also makes possible in respect of the trend a somewhat lower braking torque at the wheel which is affected by the wheel signal failure.

Figure 10:
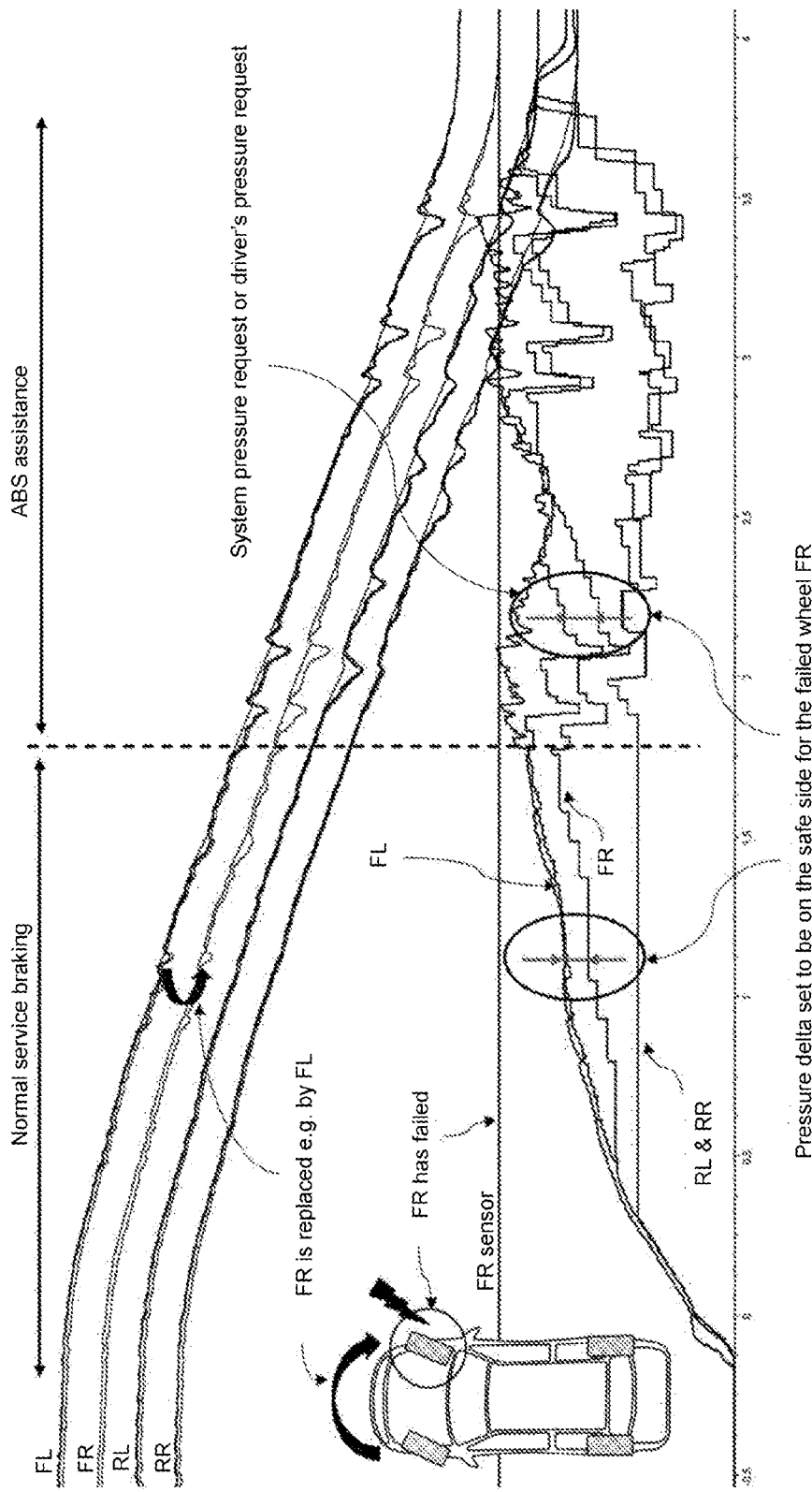
FIG. 10 shows a schematic diagram which illustrates the application of a brake pressure difference in relation to the method according to FIG. 9.

FIG. 10 shows in a schematic diagram the setting of a difference in hydraulic pressure for a service braking operation before and during an ABS assistance operation. It is assumed here that the right-hand front wheel is affected by the wheel signal failure.

In the upper region of the graphic, four lines are shown which are offset parallel to one another and illustrate the continuously falling vehicle speed. Furthermore, for each of these four lines the wheel speed which has been calculated from the wheel signal of the corresponding wheel sensor S1 to S4 is illustrated. Owing to the failure of the sensor S3 for the right-hand front wheel, the failed wheel signal has been replaced by the wheel signal of the sensor S1 for the left-hand front wheel (cf. arrow top left).

Continuous deviations between the vehicle speed and the respective wheel speed can be clearly seen. If such a deviation exceeds a slip threshold, an ABS assisted process of the service brake operation is carried out as illustrated on the right-hand side of the graphic. The slip calculation is based on the calculation of a deviation of an individual wheel speed from the vehicle speed. The vehicle speed can be determined on the basis of the wheel speed of a slip-free wheel or in some other way (e.g. on the basis of a satellite-based positioning system).

In the lower part of FIG. 10, the increase in brake pressure at the four wheel brakes 130A to 130D is illustrated. Overall, a higher brake pressure is built up at the two front wheels (FL, FR) than at the two rear wheels (RL, RR). The brake pressure at the two front wheels is set here in such a way that a pressure difference is set. Specifically, the brake pressure at the right-hand front wheel, which is affected by the wheel signal failure, is always lower by a certain "pressure delta" than the brake pressure at the left-hand front wheel which is not affected by the wheel signal failure. This applies both to the normal service braking operation and to the ABS-assisted service braking operation. The setpoint brake pressure at the front wheels, which is requested, for example, by a system for autonomous or partially autonomous driving or via driver, is also indicated in FIG. 10. The driver's request can be determined from the main cylinder pressure.

Particularly the pressure delta before the ABS assistance process can also be applied taking into account a reduction in noise and/or vibrations. In this way, the noise vibration harshness (NVH) properties of the brake system 100 can be improved. The rear axle in FIG. 10 is controlled, for example, according to the principle of dynamic rear proportioning (DRP) (and not yet in the abovementioned SLB mode).

As is apparent from the exemplary embodiments, the solution proposed here permits a higher level of availability of the vehicle brake system, and in particular of the ABS, in the case of a wheel signal failure. This higher availability is indispensable, in particular, for autonomous or partially autonomous driving, but is also desirable in conventional vehicles.

While example, non-limiting embodiments have been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

The invention claimed is:

1. A method for a vehicle having a plurality of wheels which are each assigned at least one sensor for generating wheel signals comprising:
   determining whether one of the wheels is affected by a failure of the corresponding wheel signal;
   receiving wheel signals which are assigned to the wheels, wherein the corresponding wheel signal for a wheel which is affected by a wheel signal failure is received in the form of a substitute signal;
   calculating a target brake pressure for a wheel at which an increase in brake pressure is necessary, in accordance with the wheel signal which is obtained for the wheel and with the determination as to whether the wheel is affected by a wheel signal failure, wherein the wheel at which the increase in brake pressure is necessary is affected by the wheel signal failure, the target brake pressure is calculated on the basis of the wheel signal which is obtained for the wheel with a lower setting than if the wheel were not affected by the wheel signal failure; and
   applying the target brake pressure starting from a point when a predefined minimum vehicle deceleration or a predefined minimum brake pressure is reached at the wheel affected by the wheel signal failure.

2. The method as claimed in claim 1, wherein the form the substitute signal uses the wheel signal of at least one sensor which is assigned to a wheel which is not affected by the wheel signal failure.

3. The method as claimed in claim 2, wherein the substitute signal corresponds to a wheel signal which is assigned to a comparison wheel which is not affected by the wheel signal failure.

4. The method as claimed in claim 3 further comprising, calculating the target brake pressure at the wheel which is affected by the wheel signal failure so that the target brake pressure is lower than a wheel brake pressure which is calculated for the comparison wheel.

5. The method as claimed in claim 3 further comprising maintaining a predefined pressure difference between the wheel which is affected by the wheel signal failure and the comparison wheel.

6. The method as claimed in claim 5, wherein an absolute value of the pressure difference is dependent on whether a signal of at least one further sensor of a vehicle dynamics control system is available, wherein the further sensor is different from the at least one sensor for generating the wheel signals.

7. The method as claimed claim 5 further comprising, compensating a pulling of the vehicle to an one side of the vehicle as a result of the pressure difference.

8. The method as claimed claim 1, wherein the determining whether one of the wheels is affected by the wheel signal failure further determines a slip threshold for an anti-lock brake control operation for the wheel affected by the wheel signal failure.

9. The method as claimed in claim 8, wherein the slip threshold for an anti-lock brake control operation for the wheel affected by the wheel signal failure is lower than a slip threshold for a wheel on a same axis which is not affected by the wheel signal failure.

10. The method as claimed in claim 1, where the vehicle is autonomous or partially autonomous vehicle.

11. A device for a vehicle having a plurality of wheels which are each assigned a sensor for generating wheel signals comprising
a determination whether one of the wheels is affected by a failure of the corresponding wheel signal;
a receipt of wheel signals which are assigned to the wheels, wherein the corresponding wheel signal for a wheel which is affected by a wheel signal failure is received in the form of a substitute signal;
a calculation of a target brake pressure for a wheel at which an increase in brake pressure is necessary in accordance with the wheel signal which is obtained for this wheel and in accordance with the determination as to whether this wheel is affected by a wheel signal failure, when the wheel at which the increase in brake pressure is necessary is affected by the wheel signal failure, the target brake pressure which is calculated on the basis of the wheel signal which is obtained for the wheel is given a lower setting than if the wheel were not affected by the wheel signal failure; and
an application of the target brake pressure starting from a point when a predefined minimum vehicle deceleration or a predefined minimum brake pressure is reached at the wheel affected by the wheel signal failure.

12. The device as claimed in claim 11, wherein the substitute signal corresponds to a wheel signal which is assigned to a comparison wheel which is not affected by the wheel signal failure.

13. The device as claimed in claim 12, wherein the calculation of the target brake pressure at the wheel which is affected by the wheel signal failure is lower than a wheel brake pressure which is calculated for the comparison wheel.

14. The device as claimed in claim 13, wherein a predefined pressure difference between the wheel which is affected by the failure and the comparison wheel is maintained.

15. The device as claimed in claim 14, wherein an absolute value of the pressure difference is dependent on whether a signal of at least one further sensor of a vehicle dynamics control system is available, wherein the further sensor is different from the sensors for generating the wheel signals.

* * * * *